United States Patent Office 3,736,299
Patented May 29, 1973

3,736,299
THERMALLY STABLE POLYMERS HAVING CONTIGUOUS PYRAZINE, IMIDAZOLE AND Δ³-PYRROLINE RINGS
Carl S. Marvel, Tucson, Ariz., assignor to E. I. du Pont de Nemours and Company, Wilmington, Del.
No Drawing. Filed June 30, 1971, Ser. No. 158,521
Int. Cl. C08g 33/02
U.S. Cl. 260—78 R    11 Claims

ABSTRACT OF THE DISCLOSURE

The polymerization of 2,3-diamino-5,6-dicyanopyrazine or its hydrolysis and alcoholysis products with a catalyst such as polyphosphoric acid gives polymers having recurring fused pyrazine, imidazole and Δ³-pyrroline rings. The polymers have high thermal stability and are useful for the preparation of molded objects, especially by high pressure techniques.

BACKGROUND OF THE INVENTION

(1) Field of the invention

This invention relates to the production of new high temperature-stable polymers from 2,3-diamino - 5,6 - dicyanopyrazine and its hydrolysis or alcoholysis products. These polymers have contiguous pyrazine, imidazole and Δ³-pyrroline fused rings.

(2) Prior art

High thermal stability has recently been provided in polymer technology by ladder polymers. These are organic polymers in which a series of rings is fused or connected in such a manner that rotation and rupture of bonds cannot readily occur. Packham et al., Polymer 10, 923 (1969), for example, reacted 1,2,4,5-tetracyanobenzene with 3,3¹,4,4¹-tetraaminodiphenyl in the presence of sodium methoxyethanolate to give products having recurring ladder-type benzimidazole units. Such polymers generally are thermally stable up to about 500° C.

The coassigned application of Hartter, Ser. No. 54,617, filed July 13, 1970, discloses and claims the new compound 2,3-diamino-5,6-dicyanopyrazine which, in the present invention, is converted to novel ladder polymers.

SUMMARY OF THE INVENTION

In accordance with the present invention, it has been found that 2,3-diamino-5,6-dicyanopyrazine and its hydrolysis or alcoholysis products can produce intractable, high temperature-stable polymers having contiguous recurring pyrazine, imidazole and Δ³-pyrroline rings. The polymers are essentially of the formula (elaborated more fully hereinafter):

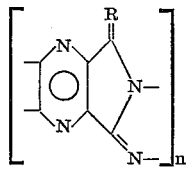

where R is =O or =NH and n is at least 10.

The polymers of the amide form, i.e., where R is =O, are of the formula:

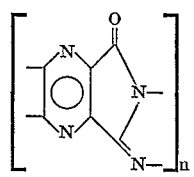

the unit being of the empirical formula $C_6N_4O$. For the imide unit, where the =O is replaced by =NH, the empirical formula is $C_6N_5H$. Neither has any nuclear hydrogen, and the bonding is such that the unit is doubly held in what can be called a "ladder" structure. Such factors account for the unusual stability of the polymers.

The polymerization of 2,3-diamino-5,6-dicyanopyrazine

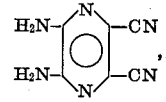

or its hydrolysis or alcoholysis products is accomplished directly with catalysis by the strongly acidic polyphosphoric acid or by base catalysts, including alkali metal salts of lower (up to 6 carbons) aliphatic alcohols and preferably lower alkoxyalkanols.

DETAILED DESCRIPTION OF THE INVENTION

As noted, the new polymeric materials have a recurring unit formed from fused, contiguous pyrazine, Δ³-pyrroline and imidazole rings. These rings are joined to each other in the order described but the units themselves can exist in different spatial configurations, i.e.,

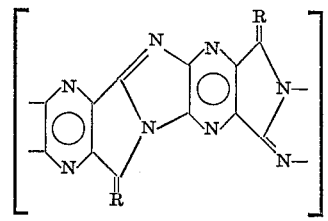

and

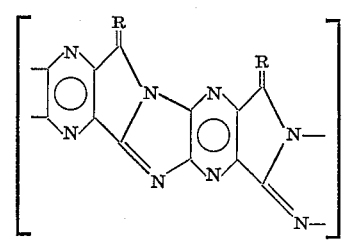

The composite structure can be called that of a "ladder" polymer regardless of the spatial configuration of the individual units. The polymers are devoid of labile carbon-hydrogen bonds, and the fused ring systems and manner in which they are joined contribute to the outstanding thermal stability. At least 10 of such units are normally joined together.

As noted, in the above structure, the R group can be either imino (=NH) or oxo (=O, carbonyl). Frequently, both may be present with the ratio dependent upon the polymerization procedure and especially upon the starting material in the preparative process employed. Several such procedures are available including the following:

(A) Direct conversion of 2,3-diamino-5,6-dicyanopyrazine by means of polyphosphoric acid (PPA) in solution (Example 1, below, the preferred process) gives the above polymer directly as by the equation:

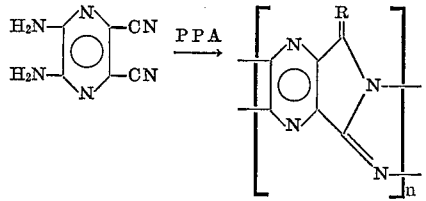

n being at least 10, and R, as before.

Polyphosphoric acid is probably unique in its dual function as a solvent and catalyst here. The concentration of 2,3-diamino-5,6-dicyanopyrazine in the acid can vary from 5–25% by weight with the preferred range being 10–15%. At 5% or less, the polymerization requires more time while, at 25% or more, polymer formation results in a mixture that has too high a viscosity for ready handling.

The temperature of the acid-catalyzed polymerization reaction is usually between 150 and 200° with 180–200° preferred. At the lower temperature, times of up to 110 hours are required while at 210–215° gas formation along with a low-viscosity product results. The time employed depends upon the temperature and degree of polymerization desired. A range of 1–150 hours is usually used with 48–100 hours generally employed at the preferred temperatures.

The polymer is separated from the polyphosphoric acid by aqueous extraction. When water alone is used, the meduim is acidic and generally about ¼ of the imino groups are hydrolyzed to carbonyl. When an excess of neutralizing agent, e.g., sodium bicarbonate, is used in the water, substantially no hydrolysis takes place and all of the R groups in the polymer are imino (=NH).

(B) Use of a basic catalyst such as an alkali metal alcoholate in a solvent, instead of polyphosphoric acid, at elevated temperatures, e.g., 80–200°, also gives direct conversion of 2,3-diamino-5,6-dicyanopyrazine (Example 3) as shown by the equation:

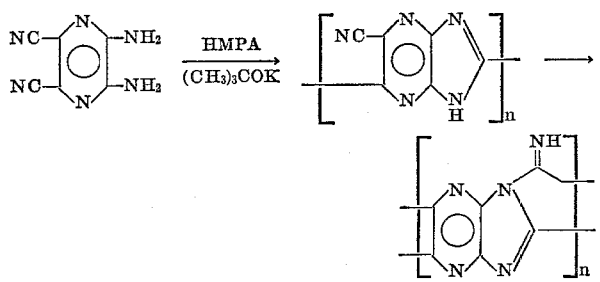

Potassium tert-butoxide and lithium and sodium 2-methoxy ethoxides have been found useful. Solvents employed include ethylene glycol monomethylether, 2-(2-ethoxyethoxy)ethanol, dimethylsulfoxide, and hexamethylphosphoramide. For this base-catalyzed polymerization, the concentration of 2,3-diamino-5,6-dicyanopyrazine or hydrolysis product is generally about 1–10% in the solvent. Usually, about 1–100 mol percent of the basic catalyst calculated on monomeric pyrazine is used.

(C) A basic catalyst can be employed with 2,3-diamino-5,6-dicyanopyrazine followed by the application of heat to an intermediate (Example 4). An equation for this process can be written as:

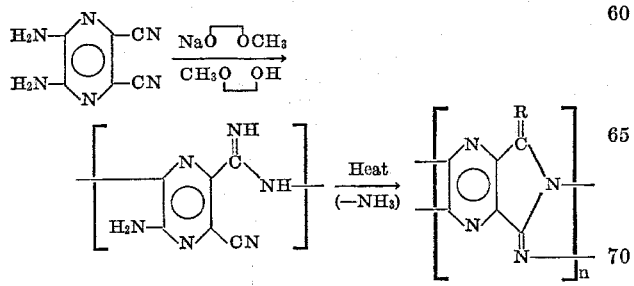

In this process, recurring units of 3-amino-5-cyano-6-amidopyrazine are joined in the 2-position of the pyrazine ring and the amide nitrogen of the amidino group. The intermediate linear polymer is obtained at relatively low temperature. Elevated temperatures (e.g., 150–350°) remove ammonia to give the thermally stable polymer.

(D) 2,3-diamino-5,6-dicyanopyrazine can be hydrolyzed by acid to produce 5,6-diaminopyrazine-2,3-dicarboximide and the latter polymerized by polyphosphoric acid as shown in the equation (Example 2):

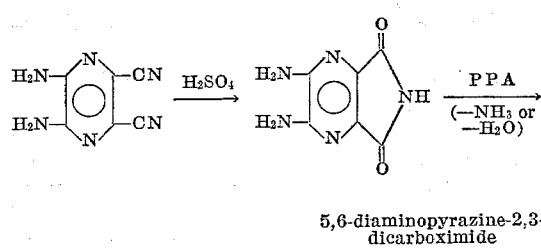

5,6-diaminopyrazine-2,3-dicarboximide

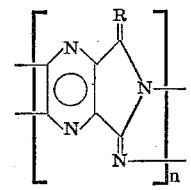

In the preceding conversions, the final polymer contains one or both of the groups imino (R=NH) and carbonyl (R=O). Usually, the ratio of carbonyl to imino in the polymeric product varies from about 4/1 to 1/4. For example, when polyphosphoric acid is used with 2,3-diamino-5,6-dicyanopyrazine followed by removal of catalyst by water extraction, the polymer had a ratio of 4/1 of imino to carbonyl groups. However, when the same pyrazine is converted as shown in Erample 2 to the imide hydrolysis product, 5,6-diaminopyrazine - 2,3 - dicarboximide, and the latter reacted with polyphosphoric acid, the polymer has a ratio of 1/4 of imino to carbonyl groups.

Regardless of the carbonyl/imino ratio, the present polymers are stable up to about 600° either in nitrogen or in air. Differential thermal analysis (DTA) shows endothermic activity at about 640° and 700°. The polymers generally have inherent viscosities of about 0.2 to 1.0 as measured in 0.1% concentration in methanesulfonic acid at about 25°. They are also soluble in concentrated sulfuric acid.

The useful temperature range for the base-catalyzed polymerization depends on the specific solvent and time. Temperatures of 80–200° are operable with 125° (refluxing ethylene glycol monomethylether) giving better quality polymer. The time of polymerization by base catalysts is generally much less than for acids. With refluxing ethylene glycol monomethylether and its sodium salt, polymer precipitates after 10 minutes. Usually base-catalyzed polymerization gives lower-viscosity products.

The polymers produced as described above and in the following detailed examples are separated from the polymerization mixture by removal of solvents, catalysts, and other monomeric materials by use of water or solvents for the latter. They are substantially insoluble (except for limited solubility in strong acids) and purified by filtration and extraction procedures.

As obtained, the present polymers are powders. These can be pressed into molded objects such as coherent bars at pressures of 80,000 p.s.i. from ambient temperatures to 500°. Shaped objects, for high temperature use as electrical or thermal insulation or in grinding or cutting wheels having abrasive mixed with the polymer and then shaped by powder metallurgy techniques are available from the new polymers. Films obtained by casting from a solution of 5–15% polymer in methanesulfonic acid can be used in high-temperature insulation, e.g., in electrical condensers. In addition, since the ultimate polymers are very intractable and colored (maroon), they can be used as pigments, suspended in a vehicle if desired and applied to a surface to give a heat-resistant organic coating.

EMBODIMENTS OF THE INVENTION

There follow some nonlimiting examples illustrative of the polymers of the invention and their preparation. In these examples, as throughout the specification, temperatures are in degrees centigrade and percentages are by weight. Inherent viscosities were taken at 25° on a 0.1% solution in methanesulfonic acid.

EXAMPLE 1

Polymer of 2,3-diamino-5,6-dicyanopyrazine (A) 2,3-diamino-5,6-dicyanopyrazine, the basic starting material for the present polymers, may be obtained as follows:

Concentrated sulfuric acid (1.3 ml.) was added, in one portion, to a stirred solution of 50.0 g. (0.472 mole) of diiminosuccinonitrile and 51.0 g. (0.472 mole) of diaminomaleonitrile in 800 ml. of acetonitrile at 30°. The temperature rose rapidly to 46° and a yellow precipitate formed. The precipitate dissolved within 30 seconds and the solution became brown and the temperature continued to rise to 54°. The product (2,3-diamino-5,6-dicyanopyrazine) began to precipitate in small crystals. The reaction mixture was stirred for a total of 1 hour, then cooled to −20° and the product collected on a filter. The brown crystalline solid was washed successively with acetonitrile and ether to give 40.7 g. (59.7% yield) of 2,3-diamino-5,6-dicyanopyrazine as light gray crystals.

Diiminosuccinonitrile is described in U.S. Pat. No. 3,564,639.

(B) A stream of dry nitrogen was passed for 20 hours through 280 ml. of stirred commercial polyphosphoric acid heated at 120°. To this deoxygenated polyphosphoric acid was added in one portion at 90°, 30.0 g. (0.188 mol) of 2,3-diamino-5,6-dicyanopyrazine. The reaction mixture was stirred vigorously in a nitrogen atmosphere as the temperature was slowly raised to 150°.

The orange-red reaction mixture was slowly heated to 180° and held at that temperature for 26 hours. The color had darkened to maroon at this time and an increase in viscosity was noted. The hot reaction mixture was poured onto ca. 5 kg. of ice. The solid which formed was filtered off and washed in a blender with distilled water 3 times. It was then digested with 5% sodium bicarbonate, filtered and washed exhaustively on the funnel with distilled water until the washes were neutral. The maroon solid was washed in a blender with acetone 3 times. The last acetone rinse was colorless. After air drying to a fine powder on the funnel, the product was dried at 140° and 300 mm. Hg in a vacuum oven giving 21.0 g. of dark maroon solid. The material had an inherent viscosity of 0.48 at 0.1% in methanesulfonic acid at room temperature. The infrared spectrum (KBr) of the product, although rather diffuse, showed considerable absorption in the 3μ region for =NH, a shoulder at 6μ related to amide >C=O and absorptions at 6.17μ, 6.29μ and 6.60μ for —C=C— and/or —C=N.

The material was molded at 40 t.s.i. (tons/sq. in.) at room temperature into coherent bars with sharply defined features. Films from methanesulfonic acid were also formed.

This material has a TGA breakpoint at 600° in a nitrogen atmosphere and at 575° in air, both at 6°/min. DTA of this polymer shows endothermic activity at ca. 640° and 700°.

(C) The table which follows gives the conditions for a number of runs which were carried out in essentially the same manner as in B.

TABLE.—POLYPHOSPHORIC ACID POLYMERIZATIONS OF 2,3-DIAMINO-5,6-DICYANOPYRAZINE

| Conditions | Inherent viscosity at 25° C. in methane sulfonic acid | TGA breakpoint (° C.) | |
|---|---|---|---|
| | | Nitrogen | Air |
| 150°/110 hrs. | 0.78 | 610 | 600 |
| 150°/4 hrs. 175°/106 hrs. | 0.88 | 615 | 605 |
| 150°/4 hrs. 200°/106 hrs. | 0.86 | 615 | 605 |
| 150°/2 hrs. 175°/108 hrs. | 0.73 | 625 | 610 |
| 150°/2 hrs. 175°/108 hrs. | 0.63 | | |
| 150°/110 hrs. | 0.73 | | |
| 150°/27 hrs. 180°/26 hrs. | 0.48 | 600 | 575 |
| 80° to 195° for 3 hrs./195° for 15 hrs. 135° to 165° for 6 hrs./165° for 12 hrs./ 165° to 185° for 4 hrs./185° for 20 hrs./ | 0.34 | | |
| 195° for 60 hrs. | 0.27 | 600 | |

EXAMPLE 2

Polymer of 5,6-diaminopyrazine-2,3-dicarboximide (A) 5,6-diaminopyrazine-2,3-dicarboximide is obtained as follows:

To 75 ml. of concentrated sulfuric acid cooled to 0–5° was added portionwise with vigorous stirring 5 g. of 2,3-diamino-5,6-dicyanopyrazine. After the addition was complete, the dark solution was allowed to warm slowly to room temperature and stirring was continued for 48 hours. The reaction mixture was poured onto 600 g. of ice and the solid which formed was collected by filtration and washed well with water and acetone leaving 4.93 g. of the red monohydrate of 5,6-diaminopyrazine-2,3-dicarboximide, M.P. 440°, dec.

IR: 3310, 3200 cm.$^{-1}$ (NH$_2$/NH); 1780, 1725 cm.$^{-1}$ (C=O); 1640, 1610 cm.$^{-1}$ (NH$_2$/C=C/C=N).

UV:

$\lambda_{\text{max.}}^{\text{H}_2\text{O}}$ 242 m$\mu$ ($\epsilon$ 20,900); 334 m$\mu$ ($\epsilon$ 8,840); 400 m$\mu$ ($\epsilon$ 2,190)

HRMS: molecular ion, meas. m/e 179.0447; calcd. m/e for C$_6$H$_5$O$_2$N$_5$, 179.0443.

Analysis.—Calcd. for C$_6$H$_5$O$_2$N$_5$·H$_2$O (percent): C, 36.55; H, 3.58; N, 35.52. Found (percent): C, 35.89, 35.75; H, 3.81, 3.49; N, 35.26; 35.23

The water of hydration can be removed in a few hours at 120° at 0.1 torr.

(B) The imide of part A was polymerized as in Example 1 according to procedure "A" above.

The polymerization conditions employed were 130° to 170° in 4 hours, 170° for 16 hours and 195° for 24 hours. The polymer had an inherent viscosity of 0.45 and a TGA breakpoint of 600° in nitrogen.

EXAMPLE 3

Polymer of 2,2-diamino-5,6-dicyanopyrazine

To a dry, 250-ml., 3-necked flask equipped with a reflux condenser and mechanical stirrer was added, in a dry atmosphere, 4.00 g. (2.5×10$^{-2}$ mol) of 2,3-diamino-5,6-dicyanopyrazine, 2.81 g. (2.5×10$^{-2}$ mol) of potassium tert-butoxide and 50 ml. of specially dried and distilled hexamethylphosphoramide (HMPA) (24 p.p.m. water by Karl Fischer test). The homogeneous, orange solution was heated over a period of 45 minutes to 145°. At 80° the solution began to darken to deep red. After ca. 5 minutes at 145° a red precipitate formed. Heating at 145° was continued for 25.5 hours. Filtration of the cooled slurry gave 6.40 g. of orange solid. This material was not visibly changed by water, but a 3.0 g. sample was converted to 2.2 g. of dark maroon powder upon being slurried with 25 ml. of 2 N hydrochloric acid. The infrared spectrum of the latter material shows a weak —CN at 4.5µ and a two band pattern at 5.6 and 5.8µ.

The C, H, N analysis of the maroon product shows a C/N ratio of 1.18. The calculated value for cyclized material is 1.20 as compared with 1.00 for uncyclized material. It appears therefore that this material has advanced almost completely to the full ladder stage. The thermal data are consistent with this hypothesis, this material showing 5% and 50% weight loss in air at 362° and 687° and in nitrogen at 309° and 733°, respectively.

The material molded well at 40 tons/sq. in. at room temperature to give well defined, glossy bars.

EXAMPLE 4

Polymer of 2,3-diamino-5,6-dicyanopyrazine (A) To a dry, 1-liter, 3-necked flask equipped with a mechanical stirrer and a reflux condenser with nitrogen adaptor was added 150 ml. of ethylene glycol monomethylether followed by 0.10 g. of a 50% by weight slurry of sodium hydride (ca. $2 \times 10^{-3}$ mol) in mineral oil. To this was added, in one portion under nitrogen, 3.20 g. ($2 \times 10^{-2}$ mol) of 2,3-diamino-5,6-dicyanopyrazine. A clear, slightly yellow solution was produced after stirring for several minutes. As the solution was heated to reflux temperature, it darkened to red, and, after 10 minutes at reflux, a dark maroon solid precipitated. The slurry was heated at reflux (125°) for 20 hours, cooled to room temperature and filtered. The very hygroscopic maroon solid was washed with acetone until the initially yellow washes were colorless. Air drying resulted in 2.83 g. of very fine maroon powder which was further dried at 110° and 0.1 torr. The infrared spectrum (KBr) shows different N—H's and/or —NH$_2$ at 3.00 and 3.09. A weak band at 5.80µ suggests a trace of C=O. A nitrile band appeared at 4.47µ. Bands at 6.12µ and 6.65µ may be C=N, C=C, and/or NH$_2$.

The inherent viscosity of the polymer at 0.1% in methanesulfonic acid at room temperature was 0.16.

Differential thermal analysis (DTA) at 15°/min. shows endothermic activity at 589° and at 761°. Thermogravimetric analysis (TGA) at 6°/min. shows 5% and 50% weight loss at 226°, 650°, and 210°, 710° in air and nitrogen respectively. The sharp break in the TGA curve occurs at about 550°.

*Analysis.*—Calcd. for C$_6$H$_4$N$_6$ (percent): C, 45.00; H, 2.52; N, 52.48. Found (percent): C, 44.24, 44.51; H, 2.40, 2.31; N, 52.51, 52.51.

(B) Part of the maroon powder from A was molded at 40 t.s.i. at room temperature giving well-defined, glossy bars.

(C) Heating at about 300° converted the polymer of A to the inert ladder-type polymer and at 400°, to insoluble polymer containing recurring units as in Example 1. The bars produced in B can thus be made more intractable, i.e., essentially cured, by heating.

Since obvious modifications and equivalents in the invention will be evident to those skilled in the chemical arts, I propose to be bound solely by the appended claims.

The embodiments of the invention in which an exclusive property or privilege is claimed are defined as follows:

1. A solid, powder-forming ladder polymer consisting essentially of repeating units consisting of contiguous fused pyrazine-imidazole-Δ$^3$-pyrroline rings and having the formula

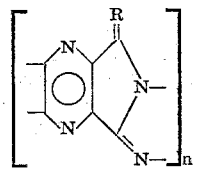

wherein R is =O or =NH and $n$ is at least 10.

2. The polymer of claim 1 wherein some of the repeating units carry =O (carbonyl) and the others, =NH (imine).

3. The polymer of claim 2 wherein the ratio of carbonyl to imine is in the approximate range 4/1 to 1/4.

4. The polymer of claim 2 wherein the ratio of carbonyl to imine is about 4/1.

5. The polymer of claim 2 wherein the ratio of carbonyl to imine is 1/4.

6. A polymer of 5,6-diaminopyrazine-2,3-dicarboximide.

7. The process of preparing a polymer of claim 1 which comprises reacting 2,3-diamino-5,6-dicyanopyrazine with polyphosphoric acid.

8. The process of preparing a polymer of claim 1 which comprises reacting 2,3-diamino-5,6-dicyanopyrazine with an alkali metal alcoholate.

9. The process of preparing a polymer of claim 1 which comprises reacting 5,6-diaminopyrazine-2,3-carboximide with polyphosphoric acid.

10. A shaped object from a polymer of claim 1.

11. The shaped object of claim 10 in the form of a film.

References Cited

UNITED STATES PATENTS

| 3,574,171 | 4/1971 | Chenevey et al. | 260—78.4 |
| 3,642,720 | 2/1972 | Kray et al. | 260—78.4 |

OTHER REFERENCES

Packham et al., Polymer 10, 923–931 (1969).
Arnold et al., Macromolecules 2, 497–502 (1969).
Jones, Chem. Brit. 6, 251–259 (1970).

JOSEPH L. SCHOFER, Primary Examiner

J. KIGHT, Assistant Examiner

U.S. Cl. X.R.

106—288 Q; 252—63.2; 260—30.8 R, 37 R, 78.4 R, 250 R, 326 R